United States Patent [19]

Ryan

[11] Patent Number: 5,426,764
[45] Date of Patent: Jun. 20, 1995

[54] CACHE MISS PREDICTION APPARATUS WITH PRIORITY ENCODER FOR MULTIPLE PREDICTION MATCHES AND METHOD THEREFOR

[76] Inventor: Charles P. Ryan, 47017 N. Meander Rd., Phoenix, Ariz. 85027

[21] Appl. No.: 111,351

[22] Filed: Aug. 24, 1993

[51] Int. Cl.⁶ ................... G06F 12/08; G06F 13/00; G06F 13/18
[52] U.S. Cl. ................... 395/425; 395/325; 364/DIG. 1
[58] Field of Search ............ 395/425, 400, 325

[56] References Cited

U.S. PATENT DOCUMENTS

| 5,093,777 | 3/1992 | Ryan | 395/400 |
| 5,261,071 | 11/1993 | Lyon | 395/425 |
| 5,285,527 | 2/1994 | Crick et al. | 395/425 |
| 5,367,656 | 11/1994 | Ryan | 395/425 |

*Primary Examiner*—Jack B. Harvey
*Assistant Examiner*—Michael A. Whitfield

[57] ABSTRACT

In a data processing system which employs a cache memory feature, a method and exemplary special purpose apparatus for practicing the method are disclosed to lower the cache miss ratio for called operands. Recent cache misses are stored in a first in, first out miss stack, and the stored addresses are searched for displacement patterns thereamong. Any detected pattern is then employed to predict a succeeding cache miss by prefetching from main memory the signal identified by the predictive address. The apparatus for performing this task is preferably hard wired for speed purposes and includes subtraction circuits for evaluating variously displaced addresses in the miss stack and comparator circuits for determining if the outputs from at least two subtraction circuits are the same indicating a pattern yielding information which can be combined with an address in the stack to develop a predictive address. The efficiency of the method and apparatus is improved by providing pattern detection logic circuitry for searching for a plurality of patterns simultaneously and priority logic circuitry which establishes precedence in the event that more than one pattern is sensed with a given set of recent cache misses.

3 Claims, 3 Drawing Sheets

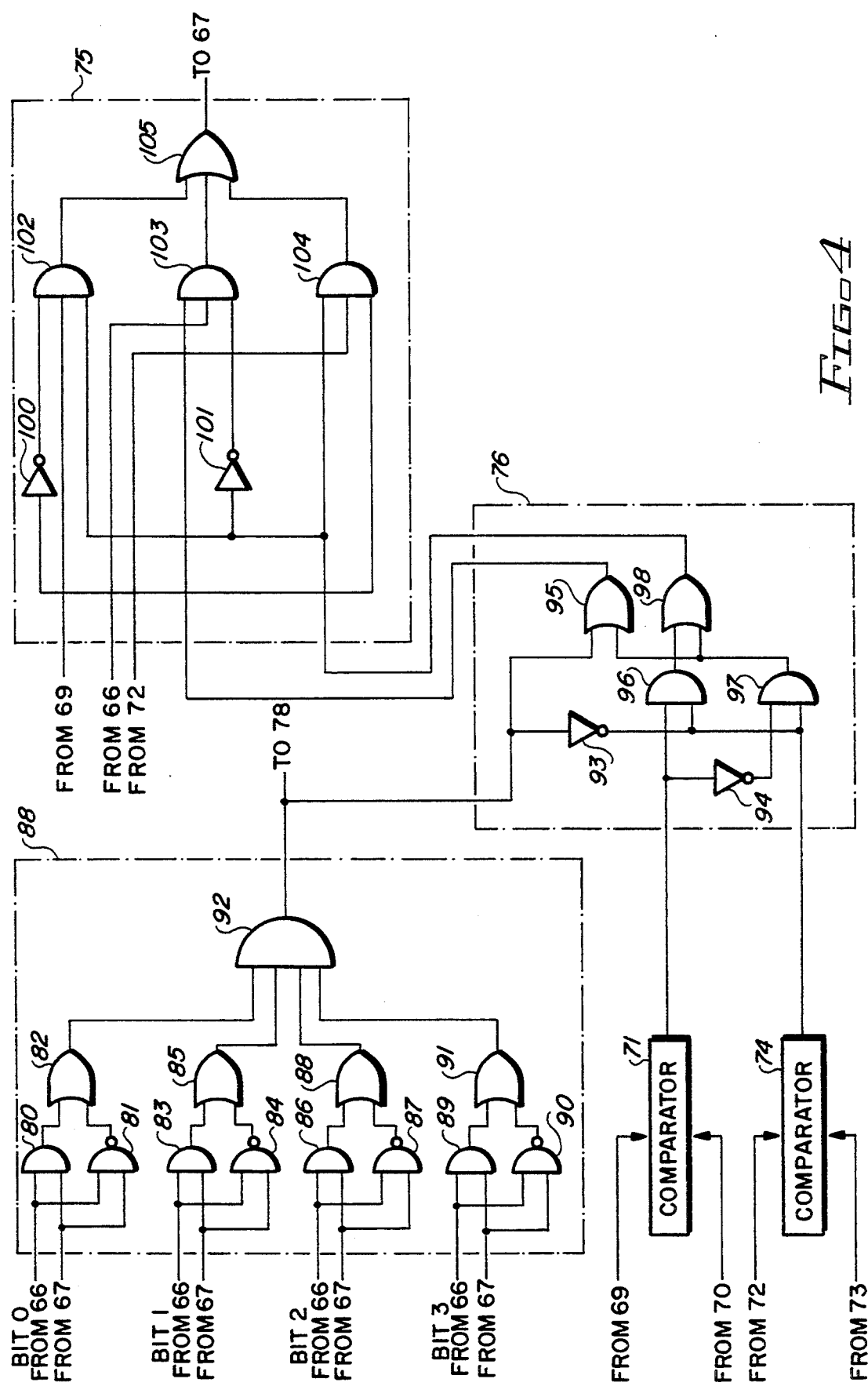

CACHE MISS PREDICTION APPARATUS WITH PRIORITY ENCODER FOR MULTIPLE PREDICTION MATCHES AND METHOD THEREFOR

FIELD OF THE INVENTION

This invention relates to the art of data processing system central processors which include a cache memory feature and, more particularly, to a method and apparatus for selectively very rapidly predicting memory cache misses for operand calls to a cache and using this information to transfer data from a main memory to cache memory to thereby raise the cache hit ratio.

BACKGROUND OF THE INVENTION

The technique of employing a high speed cache memory intermediate a processor and a main memory to hold a dynamic subset of the information in the main memory in order to speed up system operation is well known in the art. Briefly, the cache holds a dynamically variable collection of main memory information fragments selected and updated such that there is a good chance that the fragments will include instructions and/or data required by the processor in upcoming operations. If there is a cache "hit" on a given operation, the information is available to the processor much faster than if main memory had to be accessed to obtain the same information. Consequently, in many high performance data processing systems, the "cache miss ratio" is one of the major limitations on the system execution rate, and it should therefore be kept as low as possible.

The key to obtaining a low cache miss ratio is obviously one of carefully selecting the information to be placed in the cache from main memory at any given instant. There are several techniques for selecting blocks of instructions for transitory residence in the cache, and the more or less linear use of instructions in programming renders these techniques statistically effective. However, the selection of operand information to be resident in cache memory at a given instant has been much less effective and has been generally limited to transferring one or more contiguous blocks including a cache miss address. This approach only slightly lowers the cache miss ratio and is also an ineffective use of cache capacity.

Thus, those skilled in the art will understand that it would be highly desirable to provide means for selecting operand information for transitory storage in a cache memory in such a manner as to significantly lower the cache miss ratio. That end was accomplished in accordance with the invention disclosed and claimed in U.S. Patent Application Ser. No. 07/364,943 filed Jun. 12, 1989, for METHOD AND APPARATUS FOR PREDICTING ADDRESS OF A SUBSEQUENT CACHE REQUEST UPON ANALYZING ADDRESS PATTERNS STORED IN SEPARATE MISS STACK by Charles P. Ryan, now U.S. Pat. No. 5,093,777, by special purpose apparatus in the cache memory which stores recent cache misses and searches for operand patterns therein. Any detected operand pattern is then employed to anticipate a succeeding cache miss by prefetching from main memory the block containing the predicted cache miss.

Inventions which address other improvements to the invention disclosed and claimed in U.S. Pat. No. 5,093,777 are discussed immediately below for their peripheral relevance to the present invention.

Under certain operating conditions, the full time use of the procedure disclosed and claimed in U.S. Pat. No. 5,093,777 can actually raise the long term miss ratio (i.e., lower the long term hit ratio). In a typical cache based processor that executes a single process during a given period, the cache hit ratio will stabilize after some time interval following the institution of the process. If a change to another process is made, new instructions and data must be loaded into the cache such that cache hit ratio instantaneously drops dramatically and then increases as the new process is "experienced". If the cache miss prediction mechanism is in operation, the initial rate of increase in the cache hit ratio is much faster. However, the hit ratio never reaches the level it would reach in the long term if the cache miss prediction mechanism was not in use. This result is caused by the fact that the cache miss prediction mechanism continues to find and load from main memory the next possible miss which, however, is not used, thus forcing the cache to replace blocks that are more important.

The invention disclosed and claimed in U.S. Patent Application Ser. No. 07/841,687 filed Feb. 26, 1992, for SELECTIVELY ENABLED CACHE MISS PREDICTION METHOD AND APPARATUS by Charles P. Ryan overcomes the limiting effect of using the cache miss prediction mechanism continuously after a process has been changed by selectively enabling the cache miss prediction mechanism only during cache "in-rush" following a process change to increase the recovery rate; thereafter, it is disabled, based upon timing-out a timer or reaching a hit ratio threshold, in order that normal procedures allow the hit ratio to stabilize at a higher percentage than if the cache miss prediction mechanism were operated continuously.

There are operating conditions, however, under which it would be advantageous to have the cache miss prediction mechanism in operation even after cache inrush following a process change. An example of such an operating condition is when very large sets (even in excess of the cache size) of regularly addressed operand data (matrix/vector/strings) are used by a procedure. An invention which takes advantage of this characteristic is disclosed in U.S. Patent Application Ser. No. 07/850,713 filed Mar. 13, 1992, for ADAPTIVE CACHE MISS PREDICTION MECHANISM by Charles P. Ryan. This feature is achieved by special purpose apparatus which stores recent cache misses and searches for address patterns therein. Any detected pattern is then employed to anticipate a succeeding cache miss by prefetching from main memory the block containing the predicted cache miss. The cache miss prediction mechanism is adaptively selectively enabled by an adaptive circuit that develops a short term operand cache hit ratio history and responds to ratio improving and ratio deteriorating trends by accordingly enabling and disabling the cache miss prediction mechanism.

The cache miss prediction circuit disclosed therein was best adapted to operate in an environment where the main memory address space is linear and unbroken. However, in many processors, the main memory address space is paged with the sizes of the pages typically falling within the range 1024–4096 bytes. In a paged main memory environment, the memory address developed during normal operation is a virtual address that must be translated from the virtual configuration to a physical configuration. This is typically achieved by dividing the address into two fields. Some lower number of bits, which represent addressing within a page, are not translated. All the remaining, upper bits are translated by a paging unit within the processor from the virtual address space to a physical address space in a manner which is invisible to the running program. The principal purpose of providing a paged main memory is to permit addressing a much larger virtual memory; however, secondary purposes of importance include the facilitation of providing security to selected main memory pages and the ability to continue operation if a page of main memory is faulty.

The method and apparatus disclosed in U.S. Pat. No. 5,093,777 also had the inherent drawback that the patterns are always searched in the same sequence. If, for example, the pattern found is the last of eight searched, it would always require seven search cycles to find the pattern, a fact which adversely affects the advantage of prefetching the next request. This drawback was addressed and overcome by the invention disclosed and claimed in U.S. Patent Application Ser. No. 07/906,618 filed Jun. 30, 1992, for PATTERN SEARCH OPTIMIZER FOR CACHE MISS PREDICTION METHOD AND APPARATUS by Charles P. Ryan. This end is achieved by special purpose apparatus which stores recent cache misses and searches for address patterns therein. Any detected pattern is then employed to anticipate a succeeding cache miss by prefetching from main memory the block containing the predicted cache miss. The efficiency of the apparatus is improved by placing the search order for trying patterns into a register stack and providing logic circuitry by which the most recently found select pattern value is placed on top the stack with the remaining select pattern values pushed down accordingly.

The method and apparatus disclosed in U.S. Pat. No. 5,093,777 has another drawback in that it is subject to making invalid predictions or a prediction that may cause a system problem when a page boundary in main memory is crossed since operation is with physical addresses. For example, a pattern which continues onto the next page of the physical main memory may enter memory space which is reserved to some other user (or even confidential) or process, or the next page may be damaged and not intended for use, or it may contain information which is of no value to have in the cache at the present time. If the prediction process carries across a page boundary into a reserved or damaged area of memory, the processor must handle the resulting invalid states before normal processing can continue, and such remedial action may impose a severe performance penalty. This drawback is addressed and overcome by the invention disclosed and claimed in United States Patent Application Ser. No. 07/921,825 filed Jul. 29, 1992, for CACHE MISS PREDICTION METHOD AND APPARATUS FOR USE WITH PAGED MAIN MEMORY IN A DATA PROCESSING SYSTEM by Charles P. Ryan. This end is achieved by special purpose apparatus which stores recent cache misses and searches for address patterns therein. Any detected pattern is then employed to anticipate a succeeding cache miss by prefetching from main memory the block containing the predicted cache miss. The efficiency of the apparatus operating in an environment incorporating a paged main memory is improved by the addition of logic circuitry which serves to inhibit prefetch if a paged boundary would be encountered.

Those skilled in the art will understand that the several inventions discussed above may be used individually or in various combinations to establish effective operand cache features in diverse systems which may vary in cost, size, speed and the like. For those applications, however, which require the utmost in speed, they each are somewhat limited in that patterns are searched for serially. It is the purpose of the present invention to address and break this inherent speed limitation.

OBJECTS OF THE INVENTION

It is therefore a broad object of this invention to provide an improved cache memory in a data processing system.

It is another object of this invention to provide a cache memory particularly characterized by exhibiting a lower cache miss ratio in operation when operand blocks are being requested.

It is a more specific object of this invention to provide a cache memory incorporating cache miss prediction method and apparatus which makes cache miss predictions very quickly to thereby significantly increase the system speed of operation.

It is a still more specific object of this invention to provide a cache miss prediction method and apparatus which examines recent cache miss addresses simultaneously for a plurality of patterns, a selected one from which a new cache address can be determined.

SUMMARY OF THE INVENTION

Briefly, these and other objects of the invention are achieved by special purpose apparatus which stores recent cache misses and searches for address patterns therein. Any detected pattern is then employed to anticipate a succeeding cache miss by prefetching from main memory the block containing the predicted cache miss. The efficiency of the method and apparatus is improved by searching for a plurality of patterns simultaneously and by providing priority circuitry which establishes precedence in the event that more than one pattern is sensed with a given set of recent cache misses.

DESCRIPTION OF THE DRAWING

The subject matter of the invention is particularly pointed out and distinctly claimed in the concluding portion of the specification. The invention, however, both as to organization and method of operation, may best be understood by reference to the following description taken in conjunction with the subjoined claims and the accompanying drawing of which:

FIG. 4 is a more derailed logic diagram of certain of the circuitry shown in FIG. 3.

DETAILED DESCRIPTION OF THE INVENTION

Figure 1:
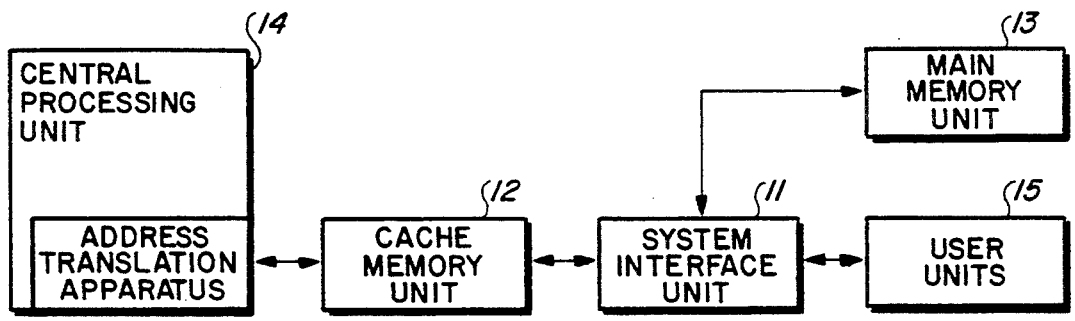
FIG. 1 is a generalized block diagram of a typical data processing system employing a cache memory and therefore constituting an exemplary environment for practicing the invention.

Referring now to FIG. 1, there is shown a high level block diagram for a data processing system incorporating a cache memory feature. Those skilled in the art will appreciate that this block diagram is only exemplary and that many variations on it are employed in practice. Its function is merely to provide a context for discussing the subject invention. Thus, the illustrative data processing system includes a main memory unit 13 which stores the data signal groups (i.e., information words, including instructions and operands) required by a central processing unit 14 to execute the desired procedures. Signal groups with an enhanced probability for requirement by the central processing unit 14 in the near term are transferred from the main memory unit 13 (or a user unit 15) through a system interface unit 11 to a cache memory unit 12. (Those skilled in the art will understand that, in some data processing system architectures, the signal groups are transferred over a system bus, thereby requiting an interface unit for each component interacting with the system bus.) The signal groups are stored in the cache memory unit 12 until requested by the central processing unit 14. To retrieve the correct signal group, address translation apparatus 16 is typically incorporated to convert a virtual address (used by the central processing unit 14 to identify the signal group to be fetched) to the real address used for that signal group by the remainder of the data processing system to identify the signal group.

The information stored transiently in the cache memory unit 14 may include both instructions and operands stored in separate sections or stored homogeneously. Preferably, in the practice of the present invention, instructions and operands are stored in separate (at least in the sense that they do not have commingled addresses) memory sections in the cache memory unit 14 inasmuch as it is intended to invoke the operation of the present invention as to operand information only.

The cache miss prediction mechanism which is an aspect of the invention is based on recognizing and taking advantage of sensed patterns in cache misses resulting from operand calls. In an extremely elementary example, consider a sensed pattern in which three consecutive misses ABC are, in fact, successive operand addresses with D being the next successive address. This might take place, merely by way of example, in a data manipulation process calling for successively accessing successive rows in a single column of data. If this pattern is sensed, the likelihood that signal group D will also be accessed, and soon, is enhanced such that its prefetching into the cache memory unit 14 is in order.

Figure 2:
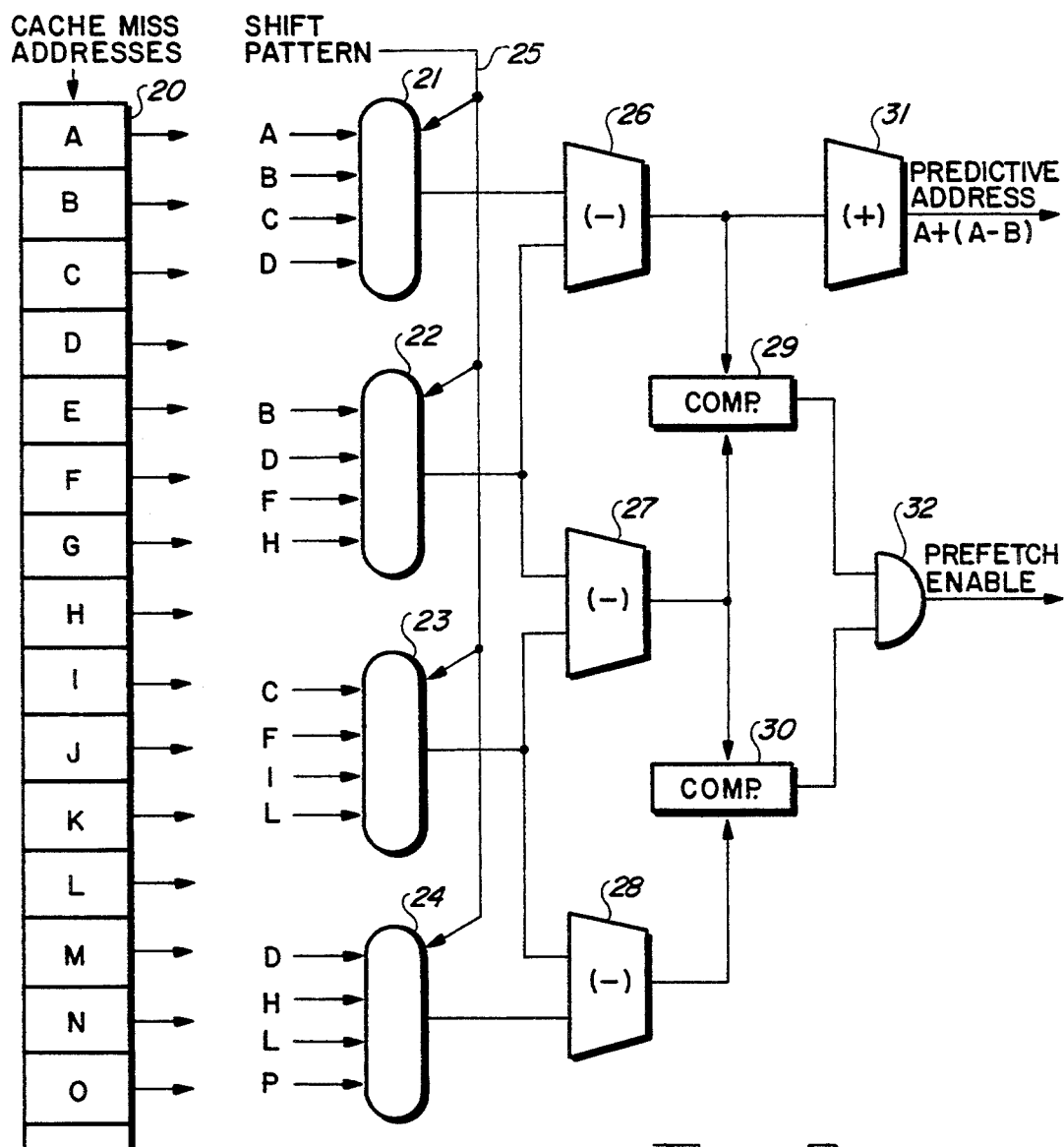
FIG. 2 is a logic diagram of a simple exemplary embodiment of the cache miss prediction apparatus disclosed and claimed in U.S. Pat. No. 5,093,777.

First discussing the prior art invention disclosed and claimed in U.S. Pat. No. 5,093,777, consider the relatively simple hardwired implementation as shown in FIG. 2. A miss stack 20 holds the sixteen most recent cache miss addresses, the oldest being identified as address P with entry onto the stack being made at the top. Four quad-input electronic switches 21, 22, 23, 24 are driven in concert by a shift pattern signal via line 25 such that: in a first state, addresses A, B, C, D appear at to respective outputs of the switches; in a second state, addresses B, D, F, H appear at the outputs; in a third state, addresses C, F, I, L appear at the outputs; and in a fourth state, addresses D, H, L, P appear at the outputs. Subtraction circuits 26, 27, 28 are connected to receive as inputs the respective outputs of the electronic switches 21, 22, 23, 24 such that: the output from the subtraction circuit 26 is the output of the switch 21 minus the output of the switch 22; the output from the subtraction circuit 27 is the output of the switch 22 minus the output of the switch 23; and the output from the subtraction circuit 28 is the output of the switch 23 minus the output of the switch 24.

The output from the subtraction circuit 26 is applied to one input of an adder circuit 31 which has its other input driven by the output of the electronic switch 21. In addition, the output from the subtraction circuit 26 is also applied to one input of a comparator circuit 29. The output from the subtraction circuit 27 is applied to the other input of the comparator circuit 29 and also to one input of another comparator circuit 30 which has its other input driven by the output of the subtraction circuit 28. The outputs from the comparator circuits 29, 30 are applied, respectively, to the two inputs of an AND-gate 32 which selectively issues a prefetch enable signal.

Consider now the operation of the circuit shown in FIG. 2. As previously noted, miss stack 20 holds the last sixteen cache miss addresses, address A being the most recent. When the request for the signal group identified by address A results in a cache miss, circuit operation is instituted to search for a pattern among the addresses resident in the miss stack. The electronic switches 21, 22, 23, 24 are at their first state such that address A is passed through to the output of switch 21, address B appears at the output of switch 22, address C appears at the output of switch 23 and address D appears at the output of switch 24. If the differences between A and B, B and C, and C and D are not all equal, not all the outputs from the subtraction circuits 26, 27, 28 will be equal such that one or both the comparator circuits 29, 30 will issue a no compare; and AND-gate 32 will not be enabled, thus indicating a "no pattern match found" condition.

The switches are then advanced to their second state in which addresses B, D, F, H appear at their respective outputs. Assume now that $(B-D)=(D-F)=(F-H)$; i.e., a sequential pattern has been sensed in the address displacements. Consequently, both the comparators 29, 30 will issue compare signals to fully enable the AND-gate 32 and produce a prefetch enable signal. Simultaneously, the output from the adder circuit 31 will be the predictive address $(B+(B-D))$. It will be seen that this predictive address extends the sensed pattern and thus increases the probability that the prefetched signal group will be requested by the processor, thereby lowering the cache miss ratio.

If a pattern had not have been sensed in the address combination BDFH, the electronic switches would have been advanced to their next state to examine the address combination CFIL and then on to the address combination DHLP if necessary. If no pattern was sensed, the circuit would await the next cache miss which will place a new entry at the top of the miss stack and push address P out the bottom of the stack before the pattern match search is again instituted.

The foregoing discussion relates to a relatively simple embodiment of the invention disclosed and claimed in the above-referenced U.S. Pat. No. 5,093,777 (incorporated by reference herein) which represents (along with the several extensions discussed above) the best known prior art to the present invention which employs some of the same principles, but is fundamentally different in other aspects. Notwithstanding their extraordinary merits, all the inventions disclosed in the prior art references discussed in the Background of the Invention section of this specification search for operand address patterns serially, and this can be a significant drawback when utmost speed of operation is desired. The present invention addresses and breaks this inherent speed limitation. It is important to note, however, that certain of the inventions disclosed in the previously discussed references can be used to advantage with the present invention.

Figure 3:
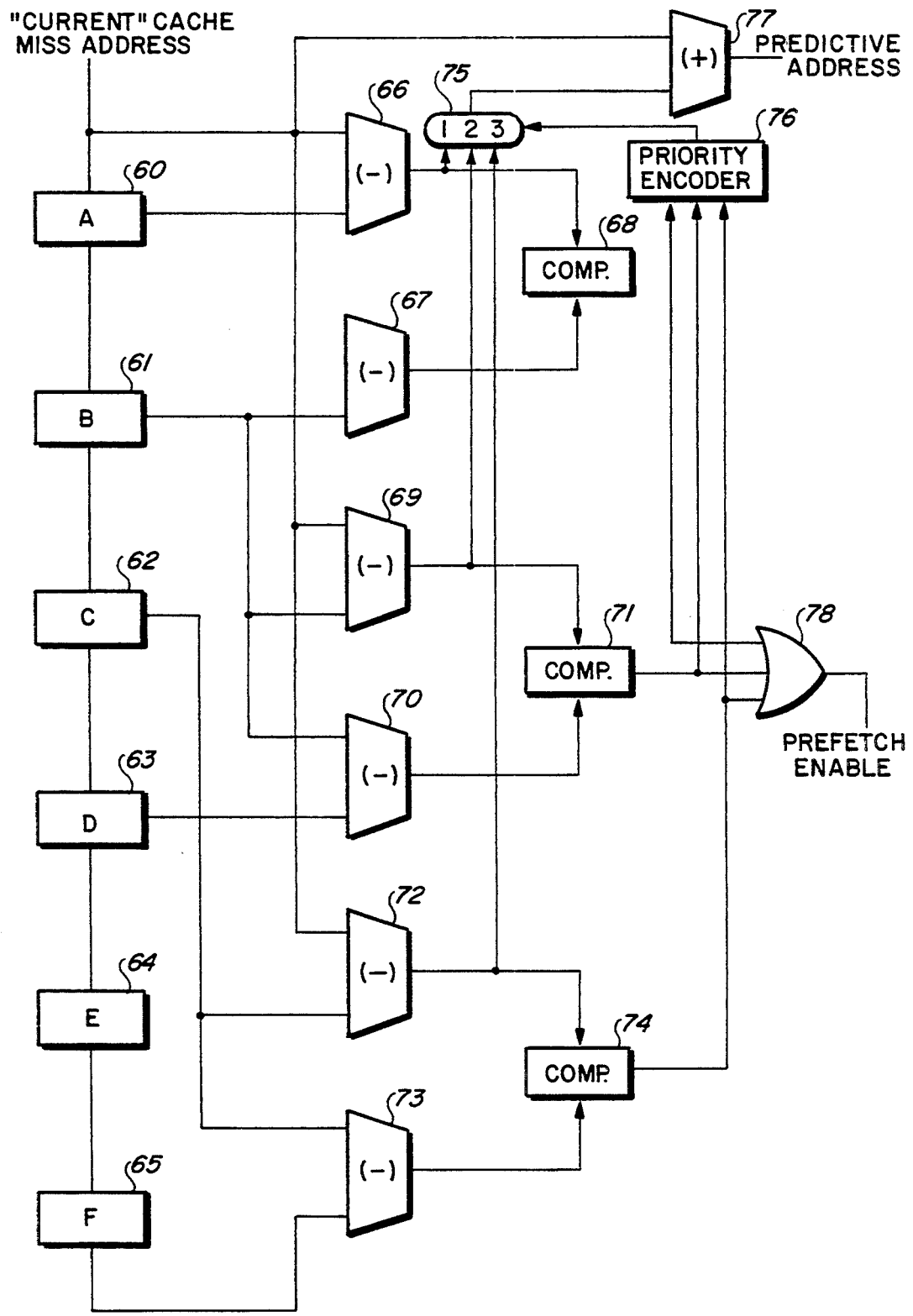
FIG. 3 is a logic diagram of an exemplary embodiment of the present invention which serves to simultaneously examine the most probable patterns of operand addresses.

Attention is now directed to FIG. 3 which is a simplified logic diagram illustrating the present invention. A series of registers 60, 61, 62, 63, 64, 65 are configured as a first-in-first-out stack to store the most recent cache miss operand addresses (the six most recent and the "current" miss in the example, the latter being considered the current top entry in the stack). An array of subtraction circuits 66, 67, 69, 70, 72, 73 each have first and second inputs representing two of the cache miss addresses. More particularly, subtraction circuit 66 has applied thereto the "current" cache miss address and cache miss address A from the register 60. Subtraction circuit 67 has applied thereto cache miss addresses A and B; subtraction circuit 69 has applied thereto the "current" cache miss address and cache miss address B; subtraction circuit 70 has applied thereto cache miss addresses B and D; subtraction circuit 72 has applied thereto the "current" cache miss address and cache miss address C; and subtraction circuit 70 has applied thereto cache miss addresses C and F.

The difference outputs from the subtraction circuits 66 and 67 are applied, respectively, to first and second inputs to a comparator 68. Similarly, the outputs from subtraction circuits 69 and 70 are applied to comparator 71, and the outputs from subtraction circuits 72 and 73 are applied to comparator 74. The outputs from subtraction circuits 66, 69, and 72 are also applied to individual inputs to an electronic switch 75 which is capable of switching a selected one of the inputs to its output.

Each of the outputs from the comparators 68, 71, 74 are applied to an individual input to an OR-gate 78 and also to an input to a priority encoder 76. The output from priority encoder 76 is applied to the electronic switch 75 as a control signal to select the signal input to the electronic switch to be passed to its output. As will be apparent:

a) if the difference between the "current" cache miss address (CCMA) and the cache miss address A (CMAA), which is the output of subtraction circuit 66, equals the difference between CMAA and CMAB, which is the output of subtraction circuit 67, then the comparator 68 issues a "compare" signal to the priority encoder 76;

b) if the difference between the "current" cache miss address (CCMA) and CMAB, which is the output of subtraction circuit 69, equals the difference between CMAB and CMAD, which is the output of subtraction circuit 70, then the comparator 71 issues a "compare" signal to the priority encoder 76; and c) if the difference between CCMA and CMAC, which is the output of subtraction circuit 72, equals the difference between CMAC and CMAF, which is the output of subtraction circuit 73, then the comparator 74 issues a "compare" signal to the priority encoder 76.

The outputs from each of the comparators 68, 71 and 74 are also applied to individual inputs to an OR-gate 78 which therefore issues a "prefetch enable" signal if any one or more of the comparators senses a "compare" condition.

Temporarily ignoring the operation of the priority encoder 76 and the electronic switch 75, assume that the conditions are such that the comparator 68 senses a "compare" condition; i.e., $(CCMA - CMAA) = (CMAA) - (CMAB)$. This would be the case, by way of example only, if CCMA and CMAA differed by one and CMAA and CMAB also differed by one indicating a distinct pattern to the ongoing series of operand addresses. Thus, a predictive address can be obtained by summing, in adder circuit 77, CCMA and the difference between CCMA and CMAA (an offset of one) to anticipate a continuation of the pattern. Corresponding examples can be analyzed for conditions b) and c) noted above.

The priority encoder 76 and electronic switch 75 are needed if more than one pattern is searched for simultaneously which is a principal purpose of the present invention. These circuits may be implemented conventionally such as by the simple configuration illustrated in FIG. 4. A four-bit address difference range is chosen for example in FIG. 4.

Thus, consider the comparison in the comparator 68 of the address differences sensed by the subtraction circuit 66 (i.e., CCMA−CMAA) and the subtraction circuit 67 (i.e., CMAA−CMAB). Each bit position from the two subtraction circuits 66, 67 is applied to one of the AND-gates 80, 83, 86, 89 and to one of the NOR-gates 81, 84, 87, 90. Referring particularly to the two Bit 0's if both are "1", the AND-gate 80 is enabled; if both are "0", the NOR-gate 81 is enabled. In either case, the OR-gate 82 is enabled to place a "1" on a first input to AND-gate 92. However, if one bit 0 is a "1" and the other is a "0", then the OR-gate 82 is not enabled. The logic for bits 1, 2 and 3 functions identically. It will therefore be understood that only if all four bits from the subtraction circuits 66 and 67 are a match will the AND-gate 92 be fully enabled. The comparators 71 and 74 respond similarly to their respective inputs.

If the AND-gate 92 is fully enabled, it issues a "1" to the priority encoder 76. Similarly, if the comparators 71 and/or 74 sense a compare condition one or both will also issue a "1" to the priority encoder 76. In this event (more than one pattern recognized) the priority encoder will serve to select the highest priority pattern present for determining the predictive address.

The output from comparator 68 is applied to an inverter 93 and also to one input to an OR-gate 95. The output from comparator 71 is applied to an inverter 94 and also to one input to an AND-gate 96. A second input to AND-gate 76 is driven by the inverter 93. The output from comparator 74 is applied to one input to an AND-gate 97 which has second and third inputs driven be inverters 93 and 94. The output from AND-gate 96 drives one input to an OR-gate 98, and the output from AND-gate 97 drives inputs to each of OR-gates 95 and 98.

The outputs from the AND-gates 98, 95 are the low order and high order bits, respectively, of the highest priority pattern detected with a given combination of previous cache miss addresses and the current cache miss address. If none of the comparators 68, 71, 74 issues a "compare" signal, then both OR-gates 98, 95 are fully disabled resulting in a "00" output to the electronic switch 75. If only comparator 68 issues a "compare" signal, OR-gate 95 is enabled, but OR-gate 98 remains disabled resulting in a "01" output to the electronic switch. If only comparator 71 issues a "compare" signal, AND-gate 96 is enabled to enable OR-gate 98 to provide a "10" output to the electronic switch. If only comparator 74 issues a "compare" signal, AND-gate 97 is enabled to enable both OR-gates 98 and 95 to provide a "11" output to the electronic switch.

If both comparators 68 and 71 issue "compare" signals, the inverter 93 prevents the AND-gates 96, 97 from becoming enabled such that the output to the electronic switch is "01" indicating that pattern #1 has precedence. The same effect is obtained if comparators 68 and 74 issue "compare" signals or if all three comparators 68, 71 and 74 issue "compare" signals; the output to the electronic switch 75 is "01" forcing selection of pattern #1. If comparators 71 and 74 both issue "compare" signals, AND-gate 96, but not AND-gate 98, is fully enabled to obtain a "10" output to the electronic switch forcing selection of pattern #2.

The electronic switch 75 is a simple decoder responsive to the output from the priority encoder 76 to switch the appropriate input (four bits each in the example) from one of the subtraction circuits 66, 69, 72 to the adder circuit 77 (FIG. 3). The inputs from the subtraction circuits are applied to respective inputs to AND-gates 102, 103, 104 such that, if one of these AND-gates is fully enabled, the OR-gate 105 is enabled to pass the selected address difference to the adder circuit 77 for adding to the current cache miss address to obtain the predictive address. If the input to the electronic switch from the priority encoder is "00", then all the AND-gates 102, 103, 104 are disabled. If the input is "01", only the AND-gate 103 is enabled to send the input from subtraction circuit 66 to the adder circuit 77. If the input is "10", only the AND-gate 102 is enabled to send the input from subtraction circuit 69 to the adder circuit 77; and if the input is "11", only the AND-gate 104 is enabled to send the input from subtraction circuit 72 to the adder circuit 77. This result is achieved by the use of the inverters 100 and 101 logically disposed respectively intermediate the OR-gate 95 and one input to the AND-gate 102 and intermediate the OR-gate 98 and one input to the AND-gate 103.

Those skilled in the art will understand that the logic circuitry of FIGS. 2 and 3 is somewhat simplified since multiple binary digit information is presented as if it were single binary digit information. Similarly, FIG. 4 treats only a four-bit wide address difference. In practice, arrays of electronic switches, gates, etc. will actually be employed to handle the added dimension as may be necessary and entirely conventionally. Further, timing signals and logic for incorporating the cache miss prediction mechanism into a given data processing system environment will be those appropriate for that environment and will be the subject of straightforward logic design.

Thus, while the principles of the invention have now been made clear in an illustrative embodiment, there will be immediately obvious to those skilled in the art many modifications of structure, arrangements, proportions, the elements, materials, and components, used in the practice of the invention which are particularly adapted for specific environments and operating requirements without departing from those principles.

What is claimed is:

1. In a data processing system incorporating a cache memory and a main memory, a method for predicting subsequent cache request addresses from historic cache miss addresses comprising: during the system hardware, firmware and software design procedure, performing the preliminary steps of:
    A) establishing a first in, first out miss stack for storing a plurality of cache miss addresses by employing at least a selected one of hardware, firmware and software design and implementation techniques; and
    B) establishing a predetermined precedence among a plurality of address patterns which may be matched during system operation;

and, during system operation, performing the following steps within the system:
    C) waiting for a cache miss resulting from the absence in the cache of called information requested of the cache;
    D) when a cache miss occurs, placing the address of the absent called information onto the top of the miss stack;
    E) examining the miss stack for the presence of a plurality of predetermined address patterns among the cache miss addresses resident therein following step D);
    F) if a plurality of predetermined address patterns are not matched, returning to step C); and
    F) if a plurality of predetermined address patterns are matched:
        1) following the predetermined precedence established in step B) to select a single address pattern for calculating a predictive address;
        2) using the selected address pattern and at least one of the addresses in the miss stack to calculate a predictive address pointed to a signal group stored in the main memory;
        3) prefetching into cache memory from the main memory the signal group identified by the predictive address; and
        4) returning to step C).

2. Apparatus for developing a predictive address for prefetching signal groups, each identified by an address, from a main memory into a cache memory comprising:
    A) a first in, first out stack for storing a plurality of cache miss addresses representing successive cache misses;
    B) at least first and second pairs of subtraction circuit means, each said subtraction circuit means being coupled to receive a unique pair of addresses from said first in, first out stack and to issue a value representing the displacement therebetween;
    C) at least first and second comparator circuit means, each said first and second comparator circuit means being coupled to receive a pair of outputs from a corresponding pair of said subtraction circuit means and responsive to the presence of a match condition therebetween for issuing a prefetch enable logic signal; and
    D) predictive address development means adapted to combine a selected one of said cache miss addresses and displacement information appearing at one of said subtraction circuit means to obtain a predictive address, said predictive address development means including:
        1) an adder circuit;
        2) electronic switch means operatively disposed intermediate one input to said adder circuit and the output from one subtraction circuit of each pair thereof; and
    C) a priority encoder adapted to respond to the simultaneous presence of a plurality of compare conditions to provide control signals to said electronic switch means such that only one set of displacement information signals is applied to said adder circuit for combination with said selected one of said cache miss addresses to obtain said predictive address;

whereby, the coordinated presence of said predictive address and said prefetch enable logic signal causes the signal group identified by said predictive address to be prefetched from said main memory into said cache memory.

3. The apparatus of claim 2 in which said selected one of said cache miss addresses employed to calculate said predictive address is the current cache miss address.

* * * * *

UNITED STATES PATENT AND TRADEMARK OFFICE
CERTIFICATE OF CORRECTION

PATENT NO. : 5,426,764
DATED : Jun. 20, 1995
INVENTOR(S) : Charles P. Ryan

It is certified that error appears in the above-indentified patent and that said Letters Patent is hereby corrected as shown below:

On title page, item [73] add the following:
--Bull HN Information Systems Inc., Billerica, MA--

Signed and Sealed this

Twenty-first Day of May, 1996

Attest:

BRUCE LEHMAN

Attesting Officer            Commissioner of Patents and Trademarks